Figure 1:
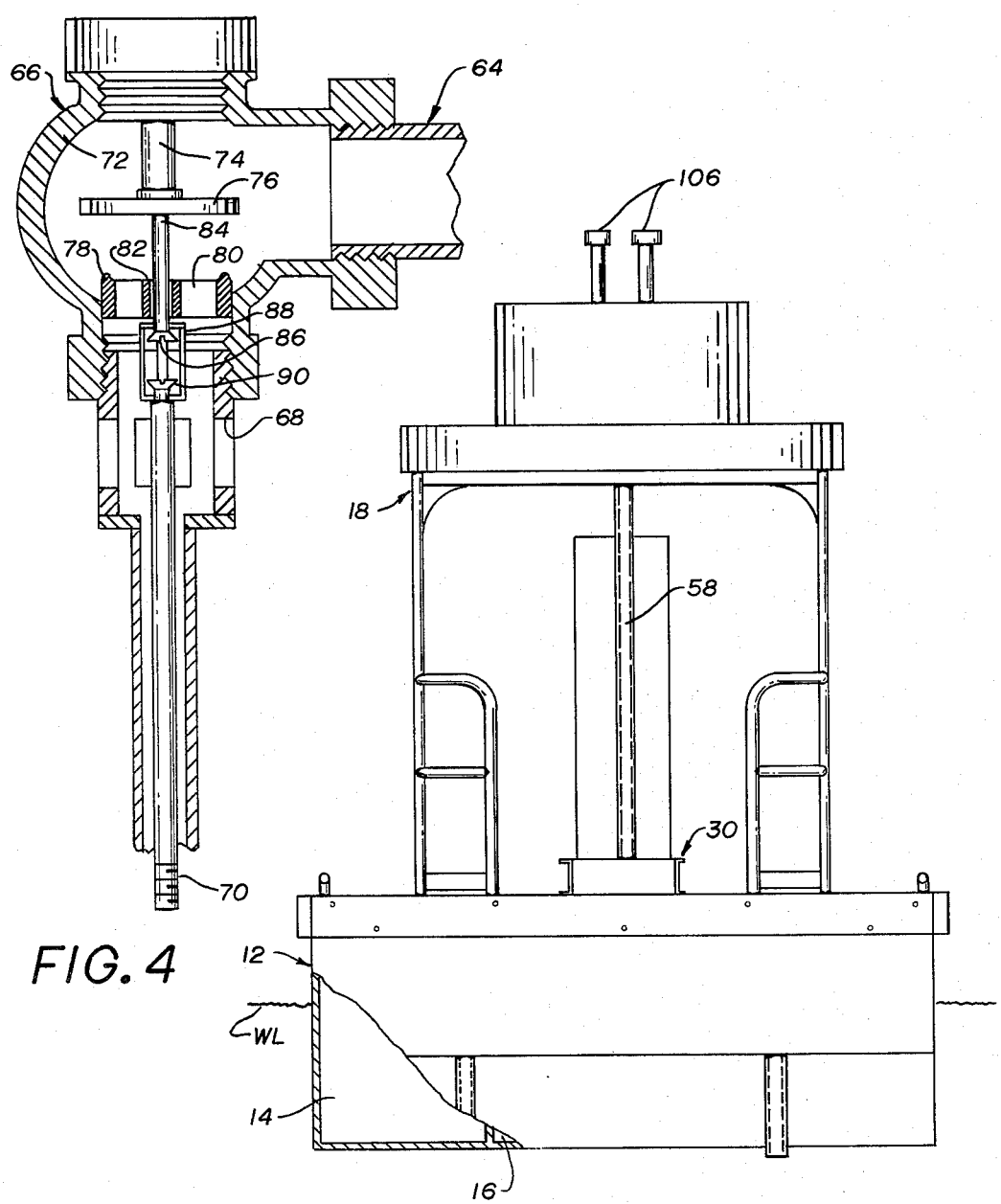

INVENTOR.
ALBERT L. CANNON

United States Patent Office 3,254,620
Patented June 7, 1966

---

3,254,620
FUEL BARGE
Albert L. Cannon, Sacramento, Calif., assignor to
Triangle Inc., Sacramento, Calif.
Filed Apr. 6, 1964, Ser. No. 357,703
11 Claims. (Cl. 114—.5)

This invention relates to a fuel barge and more particularly to a barge for fuel that is immiscible with and less dense than water, and to a system for safely and conveniently discharging fuel from the barge to small craft and the like.

High construction costs together with the varying habits of small craft owners have sevrely limited the proliferation of shore based small craft fueling facilities. The principle object of this invention is to provide a floatable barge having both safety and efficiency for storing and dispensing the gasoline to small craft. The obvious practical advantage of the barge of the present invention is that it can be towed from site to site as demands vary.

A more specific object of the present invention is to provide a barge which remains at a substantially constant level irrespective of the amount of gasoline contained therein. This object is achieved by providing a barge having a tank for storing fuel and water together with means for replacing fuel drawn from the tank by water from the body of water in which the barge resides. The level at which the barge floats in the water varies only to the extent that the density of the fuel differs from the density of the water.

Another important object of the present invention is to provide apparatus to assure that only gasoline and not water is delivered to the customer. Attainment of this object is made possible by providing a dome on the top of a main fuel tank and discharging gasoline from a pipe having an inlet opening near the top of the dome. A float operated valve is provided for admitting air into the dome when the water level approaches the dome, and when air so enters the dome, the liquid level therein drops well below the inlet opening of the fuel line.

Still another object of the present invention is to provide an overflow pipe through which water in the tank is discharged when the tank is filled with gasoline and which overflow pipe serves to maintain the proper pressure balance between the interior of the tank and the surrounding atmosphere. This object is achieved by providing an overflow pipe extending from a lower portion of the tank interior to an orifice terminating exterior of the tank at a level substantially the same as the base of the dome. Thus water in the tank cannot rise materially above the level of the base of the dome.

Yet another object is to provide a mechanism for automatically interrupting the inflow of fuel to the tank during the filling operation, such interruption taking place when an appropriate amount of fuel has been taken into the tank. It is important when filling the tank with fuel to avoid discharging gasoline through the overflow pipe and into the body of water in which the barge resides. By providing a float which floats in water but sinks in fuel, a valve at the fuel inlet pipe can be controlled.

A further object of the present invention is to provide a safety device to prevent discharge of gasoline into the body of water in which the barge resides. This object is accomplished by providing a compartment surrounding the overflow pipe which compartment communicates to the body of water through a float valve. The float valve is adapted to remain open when the compartment is filled with water but to close should the compartment inadvertently become filled with gasoline. So long as the valve is closed gasoline cannot egress from the compartment to the surrounding body of water.

Figure 2:
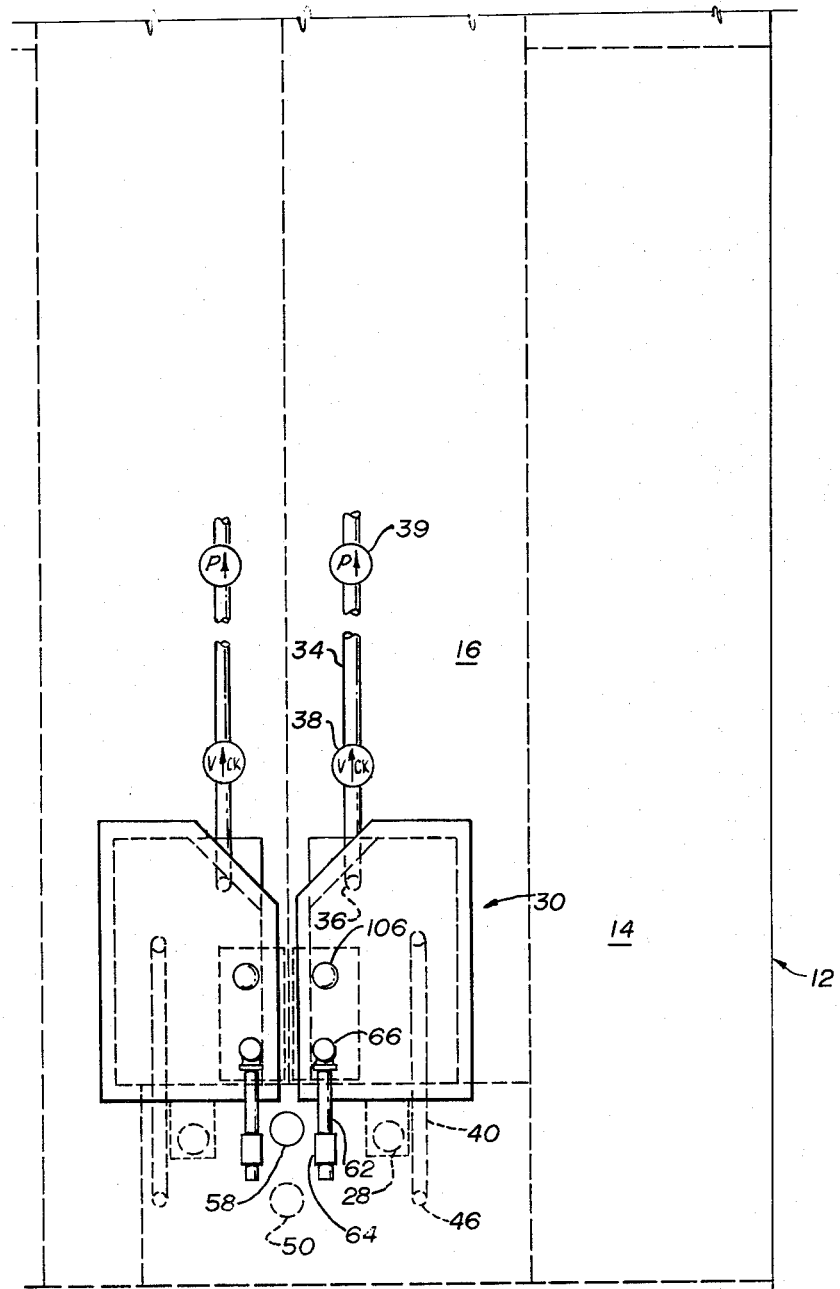
Figure 3:
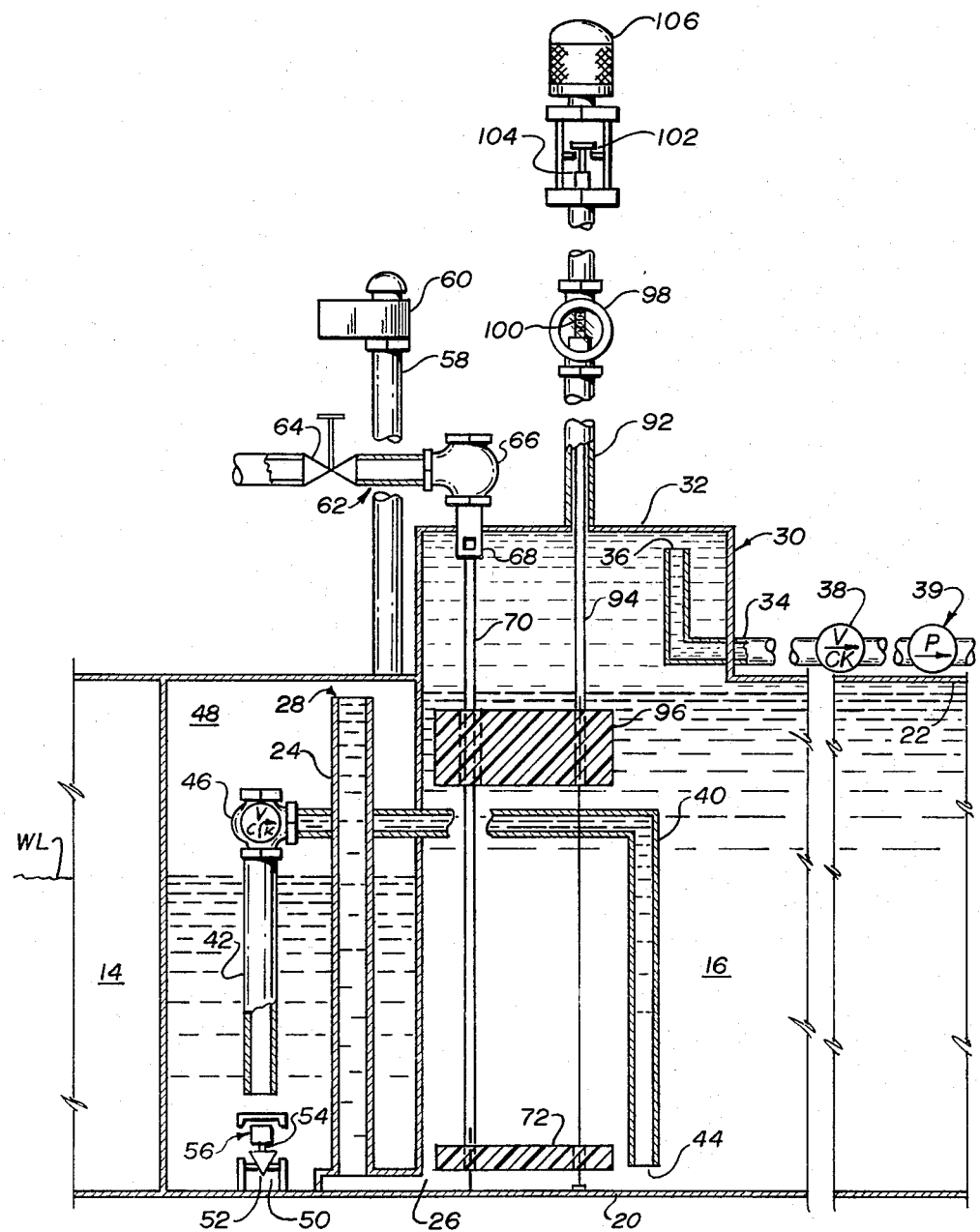

These and other objects will become apparent after referring to the following specification and accompanying drawings in which:

FIGURE 1 is an end elevation of a barge incorporating my invention;
FIGURE 2 is a partially schematic plan view of the barge;
FIGURE 3 is a partial side elevation view in cross section with portions of the system shown schematically for clarity; and
FIGURE 4 is an improved fill valve used in my improved barge.

The barge of the present invention includes a hull 12 having buoyancy tanks 14 surrounding a central fuel tank or tanks 16. A suitable superstructure 18 is provided on barge 12 for protecting the barge and associated equipment from the elements.

Tank 16 is defined by a bottom wall 20 and a top wall 22; buoyancy tanks 14 are sized with respect to the weight of the barge when tank 16 is full so that the water line WL of the body of water in which the barge resides is intermediate bottom wall 20 and top wall 22 of the tank. An overflow pipe 24 extends from a point at its lower end 26 proximate bottom wall 20 of tank 16 to an upwardly open orifice 28 above water line WL and at a level approximating that of top wall 22. Extending upwardly from top wall 22 is an air tight dome 30, the upper extremity 32 of which is spaced above top wall 22 by an amount which is a function of the specific gravity of the fuel being stored and dispensed and of the distance of orifice 28 above lower end 26 of the overflow pipe. By way of example, gasoline has a specific gravity, $Sp_f$, of approximately .75 (specific gravity of water $Sp_w$, is equal to 1.00) and in designing a barge for gasoline the space between top wall 22 and upper extremity 32 of dome 30 is equal to one-third, or $(Sp_w-Sp_f)/Sp_f$ times, the vertical distance from orifice 28 to lower end 26 of overflow pipe 24. Therefore a column of water in overflow pipe 28 can support gasoline in dome 30 up to the upper extremity of the dome.

The horizontal cross sectional area of dome 30 is materially smaller than the cross sectional area of tank 16 for reasons that will appear hereinafter.

As a practical maximum, dome 30 has a horizontal cross sectional area equal to about 25% of the horizontal cross sectional area of tank 16. In practice, I prefer to construct the dome with a horizontal area equal to about 10% to 12.5% of the area of tank 16.

A fuel discharge line 34 has an upwardly opening inlet 36 proximate upper extremity 32 of dome 30 and transpierces dome 30 to the exterior thereof at which site a check valve 38 is provided for preventing the inflow of air or liquid into the dome. A conventional pump 39 is attached to fuel outlet line 34 for delivering fuel to a small craft. As fuel is withdrawn from the dome through line 34, a water inlet passage 40 is provided for replacing the volume vacated by the withdrawn gasoline with water from the surrounding body of water in which the barge resides. Water inlet passage 40 includes an input opening 42 beneath water line WL and exterior of tank 16, and an outlet opening 44 proximate lower wall 20 of tank 16. Above input opening 42 and outlet opening 44 is a check valve 46 for preventing egress of liquid from tank 16 to the exterior thereof through water passage 40. Check valve 46 is shown as disposed at a level above water line WL for ease of inspection, but may be below the water as convenience dictates so long as water inlet passage 40 affords siphon action.

Although water input opening 42 can communicate directly with the body of water in which the barge resides, I prefer to house the input opening in a compartment 48 which also houses orifice 28 of overflow pipe 24. Compartment 48 communicates with the surrounding water in which the barge resides through a valved opening 50. Opening 50 includes a seat for receiving in sealing engagement therewith a valve body 52 which is connected by an operating rod 54 to a float 56. The specific gravity of float 56 is intermediate that of water and of the fuel being stored in tank 16 so that only when compartment 48 is filled with water will the compartment communicate with the surrounding body of water in which the barge resides. Thus, should flammable fuel fill compartment 48, valve body 52 will seat in opening 50 and prevent the egress of fuel into the surrounding water. Compartment 48 is provided with an air vent 58 extending upwardly therefrom and terminating well above water line WL in a flame arrester 60 of any suitable type.

Should compartment 48 be inadvertently filled with fuel so as to cause valve body 52 to seat in opening 50, the fuel may be readily returned to tank 16 by the simple expedient of manually retaining valve 52 in a closed position while operating pump 39. The fuel is thereby drawn into tank 16 through water inlet line 40.

For filling fuel tank 16 with fuel, I provide a fuel inlet line 62 which includes a controllable stop valve 64 exterior dome 30, and a float operated valve 66 within the dome. Valve 66 includes a discharge opening 68 through which gas enters the tank. The valve is operated by a vertically reciprocable rod 70 at the lower end of which is mounted a float 72. Float 72 has a specific gravity intermediate that of water and fuel to the end that valve 66 will close when the water level is lowered in pipe 62, float 96 follows the interface between fuel and also above openings 26 and 44.

Referring to FIGURE 4, the details of valve 66 may be seen to include a valve housing 72 including a depending projection 74 for limiting the upward movement of valve body 76 to a point approximately midway between the vertical extremities of the housing cavity. The valve includes a seat 78 having radially extending webs 80 which support a bushing 82 formed to slidably support an actuating rod 84 affixed to valve body 76. The lower end 86 of operating rod 84 is enlarged to be slidably embraced by a cage structure 88. The upper end 90 of valve actuating rod 70 is similarly provided with an enlarged portion in engagement with cage member 88 to the end that, as actuating rod 70 is pulled downwardly by the weight of float 72, valve body 76 can seat against valve seat 78 when the pressure on the upper surface of the valve body exceeds the pressure below it. Thus, it will be seen that when fuel in the tank 16 has reached the desired level by expelling water from overflow pipe 28, valve 66 will close rapidly and securely due to the sliding link between the valve body and the float afforded by cage structure 88.

Extending from upper extremity 32 of dome 30 is a conduit 92 which is in air communication with the dome and which slidably supports a rod 94 for vertical reciprocal movement therein. To the lower end of rod 94 is a float 96 which has a specific gravity intermediate that of water and fuel to the end that float 96 resides at a level approximating that of the interface between the upper layer of fuel and the lower layer of water in the tank. Conduit 92 is provided with a sight glass 98 for viewing calibrated marks 100 on rod 94 so as to afford a visual indication of the amount of fuel in tank 16. At the upper extremity of conduit 92 is an air valve 102 which is normally closed except when lifted off its seat by the upper end 104 of rod 94. A suitable flame arrester of conventional type 106 is provided between valve 102 and the surrounding atmosphere.

The operation of my improved barge is as follows: Tank 16 is initially filled with water, for example through a manhole (not shown) in dome 30 or through any like opening, to a level determined by the height of orifice 28 in overflow pipe 24. Thereupon, the dome and tank are sealed and gasoline is applied through fuel inlet line 62 and valve 66. Since gasoline or like fuel is lighter than water, the gasoline entering the tank will float on the surface of the water within the tank and will displace water from the tank through overflow pipe 24. As fuel is conducted into tank 16 through fuel inlet pipe 63, float 96 follows the interface between fuel and water thereby providing a visual indication of the level of fuel through sight glass 98 as well as permitting valve 102 to seat and thereby seal dome 30 from the atmosphere. When the interface between the gasoline and water reaches a level near bottom wall 20 of tank 16, float 72 will effect closure of valve 66 and the inflow of the fuel through line 62 will terminate. In the afore-described condition, gasoline will entirely fill dome 30 and will there be supported by the pressure head of the water column remaining in overflow pipe 24, since the water is more dense than the gasoline in tank 16. By way of example in one embodiment of my invention the vertical distance from lower end 26 to orifice 28 of overflow pipe 24 is forty-two inches and the distance from the orifice to upper extremity 32 of dome 30 is fourteen inches. A barge so constructed is suitable for storing and dispensing gasoline having a specific gravity of .75 because the relative pressure head in overflow pipe 24 (1x42) is equal to the relative pressure head in the tank and dome (.75(42+14)).

As fuel is withdrawn from fuel discharge line 34, the presence of a water column in overflow pipe 24 together with the fact that dome is sealed from the atmosphere, maintains the level of gasoline co-extensive with the upper extremity 32 of dome 30, and therefore covers discharge opening 36 so that the fuel may be withdrawn. In maintaining the fuel level up to upper extremity 32 of the dome 30, the level of water column in pipe 24 necessarily falls. As the water level in pipe 24 reaches a level approximating that of water line WL, the pressure exterior of check valve 46 exceeds that interior of the tank as a consequence of which water enters tank 16 through water inlet line 40. The water inflow will continue as needed during discharge of fuel through fuel outlet pipe 34. When discharge of the fuel from line 34 is discontinued inflow of water through water inlet line 40 will continue until equilibrium is established between the column of water in overflow pipe 24 and the column of fuel and water within tank 16. Also assuring that dome 30 remains full at all times is a vacuum formed in conduit 92 above the fuel level. As fuel is discharged from tank 16 and replaced by water the overall weight of the barge will increase due to difference of the specific gravity of water and fuel. However, in one embodiment of my invention, it has been found that a barge having a capacity of approximately 3450 gallons varied only about four inches as regards the position of the water level on the sides of the barge.

As the barge nears the "empty" position, that is, a condition wherein the fuel-water interface approaches the level of orifice 28, float 96 causes end 104 of rod 94 to open valve 102. When valve 102 is opened, the vacuum within conduit 92 is released and the level of fuel in dome 30 rapidly drops below inlet end 36 of fuel discharge line 34. Because the cross sectional area of dome 30 is much less than the cross sectional area of tank 16, a small decrease in level in tank 16 causes a correspondingly greater decrease in fuel level in the dome. As stated hereinabove, I prefer to construct dome 30 approximately one-eighth the cross sectional area of tank 16 so that when float 96 rises so as to open valve 102, the drop of fuel level within the dome will be abrupt and will rapidly clear fuel inlet opening 36 so that only air will be withdrawn through fuel outlet pipe 34. Therefore the pump connected to the fuel line will draw only air rather than water. This aspect of the invention has another important advantage in that should some contaminating intermixture of gasoline and water occur at the interface, the gasoline so contaminated will always be below inlet opening 36. When the fuel supply in the tank has reached the condition last described a gasoline source is attached to line 62, valve 64 is opened and the tank is refilled until such a time as float 72 effects clossure of valve 66.

Should some malfunction occur which permitted excessive gas to enter the tank through valve 66, such gas would be discharged through overflow pipe 24 into compartment 48. The gas will accumulate in compartment 48 until all water is driven out of the compartment through opening 50. Such discharge through opening 50 will continue until the fuel-water interface in compartment 48 reaches float 56 at which time valve body 52 is lowered to seat in opening 58 and close the opening. Therefore no fuel will be discharged into the body of water in which the barge resides.

Thus it will be seen that I have constructed a fuel barge which is extremely safe in operation, assures the consumer that pure gas only will be delivered from fuel discharge line 34 and a barge which maintains a substantially constant position with respect to the water line. In achieving the foregoing I have utilized a minimum number of extremely rugged parts.

While one embodiment of my invention has been shown and described, it will be apparent that other adaptations and modifications can be made without departing from the true spirit and scope of the invention.

I claim:

1. A barge for use in a body of water of specific gravity $Sp_w$ to store and dispense fuel having a specific gravity $Sp_f$ less than $Sp_w$ and which fuel is immiscible with water, said barge comprising: a tank having a top wall and a bottom wall; means for buoying said tank in the water at a level whereby the water line with respect to the tank is intermediate said top and bottom walls when the tank is full of water, fuel, or a combination thereof; a pipe extending from the interior of said tank adjacent said bottom wall and terminating exterior of said tank at a level approximating the top wall, said pipe terminating in communication with the atmosphere to define a reference level, a water inlet passage communicating from the surrounding water to a point within said tank adjacent said bottom wall, said inlet passage including a check valve for affording flow through said passage only into said tank, a dome extending upwardly from said top wall for defining a volume of reduced cross sectional area with respect to the cross section area of said tank; a fuel discharge line having an inlet end in said dome so that when fuel is withdrawn therefrom the pressure within said tank is reduced to permit water to enter through said inlet passage and thus maintain the tank in a full condition, water in said pipe being active to maintain fuel in said dome.

2. A barge for placement in a body of water of specific gravity $Sp_w$ to store and dispense fuel having a specific gravity $Sp_f$ less than $Sp_w$ and which fuel is immiscible with water, said barge comprising a tank having a top wall and a bottom wall, means for buoying said tank in the water with the water line of the body of water intermediate the top and bottom wall, an overflow pipe extending from the interior of said tank adjacent the bottom wall thereof to a point exterior said tank at the approximate level of said top wall, a water inlet passage to said tank from beneath the water level exterior said tank to a point in said tank adjacent said bottom wall, a check valve in said water inlet passage for preventing outflow of water therethrough, an air-tight dome mounted on said top wall in communication with said tank, a fuel outlet pipe communicating from the interior of said dome to the exterior thereof, said dome extending upwardly from said top wall by an amount approximately equal to $(Sp_w-Sp_f)/Sp_f$ times the height of said overflow pipe so that when said tank and dome are full of fuel the static head of pressure thereof is balanced by static head of water pressure in said overflow pipe, said dome having a horizontal cross section less than about 25% of the horizontal cross section area of said tank so that when fuel is withdrawn from said dome through said fuel outlet pipe the static pressure head decrease consequent thereon is greater than the static pressure head increase resulting from the inflow of water through said water inlet passage thus to create a vacuum to draw water in through said passage, an air line to the top of said dome, a valve for normally closing said air line, and means responsive to attainment of a level of water in said tank at the height of said top wall for opening said valve, whereby when the water in said tank reaches a level sufficient to open the valve air only can be withdrawn from said fuel outlet pipe.

3. The invention of claim 2 wherein said valve opening means comprises a float having a specific gravity intermediate $Sp_w$ and $Sp_f$, a rod affixed to said float, and means for supporting said rod in said tank for vertical reciprocation in response to movement of said float; said valve being constructed and arranged to open by the upward movement of said rod.

4. A barge for fuel of a specific gravity $Sp_f$ comprising a fuel tank having a top wall and a bottom wall, means for buoying said tank in water having a specific gravity $Sp_w$ with the water line on said tank being intermediate said top and bottom walls, an overflow pipe communicating with the interior of said tank and extending exteriorly of the tank to a level approximating the level of the top wall to define a reference level, a dome communicating with said tank and extending upwardly from said top wall by an amount equal to $(Sp_w-Sp_f)/Sp_f$ times the distance from said bottom wall to said reference level so that water in said overflow pipe will have sufficient pressure head to support fuel in said tank and dome, said dome having a horizontal cross section area less than about 25% of the horizontal cross section area of said tank so that as fuel is withdrawn from said dome and replaced by water the pressure within said dome will decrease, means forming a water inlet to said tank and extending from a point exterior said tank below the water line to a point interior the tank adjacent said bottom wall, said water inlet forming means including a check valve for affording unidirectional water flow into the tank, a fuel outlet conduit communicating with said dome for affording withdrawal of fuel therefrom, an air line communicating with said dome, an air valve normally closing the inflow of air to said dome, and means for opening said valve when the water level in said tank approximates the reference level, whereby when the water level in said tank rises to a height to open said air valve, the fuel level in said dome is abruptly lowered below said fuel outlet conduit.

5. A gasoline fuel barge including a tank for containing gasoline and water, means for buoying said tank in a body of water, an overflow pipe extending from a lower portion of said tank and terminating above the surface of the body of water, a water inlet passage extending from beneath the surface of the body of water into said tank, a check valve in said inlet passage for preventing egress of water therethrough from the tank, a dome communicating with said tank and extending above the terminating end of said overflow pipe, a discharge pipe communicating with the interior of said dome, said dome having a horizontal cross section area less than about 25% that of the tank and a height equal to one-third the height of the tank so that gasoline removed from said tank through said discharge pipe is replaced by water through said inlet passage and the gasoline level is retained against the roof of said dome, a pump for withdrawing fuel from said discharge pipe, a fuel inlet conduit including a float valve which closes when the water in said tank reaches the level of the water inlet passage so as to prevent excess gasoline from entering the tank, and means for sealably closing said inlet conduit when discharging gasoline from the tank.

6. A barge for storing and dispensing fuel of specific gravity $Sp_f$ less than the specific gravity $Sp_w$ of surrounding water, said barge comprising a main tank having a bottom wall, means for buoying said tank in water with said bottom wall below the surrounding water level, means forming a compartment associated with said main tank which compartment extends above the level of surrounding water, said compartment communicating at its upper end with surrounding atmosphere and at its lower end with surrounding water below the surface thereof, a pipe extending from a lower portion of said main tank into said compartment and terminating above the surrounding water line to define a reference level above the surrounding water line, an air-tight dome communicating with said main tank and extending above said reference level by an amount approximately equal to $(Sp_w-Sp_f)/Sp_f$ times the height of said reference level above said bottom wall, said dome having a horizontal cross section area less than about 25% of the horizontal cross section area of said main tank, means including a check valve for defining a water inlet from the surrounding water to said tank, a fuel outlet in said dome terminating proximate the upper inner extremity thereof, a pump for discharging fuel from said outlet, an air conduit extending from said dome, a normally closed air valve in said conduit, and means for opening said air valve when the water level in said main tank raises to said reference level.

7. In a fuel barge of the type wherein fuel and water are stored in a tank and a fuel discharge line communicates with a dome on top of the tank to effect withdrawal of fuel from the tank, a system for maintaining fuel at the level of said discharge line comprising a water inlet pipe extending from the exterior of the tank to the interior thereof, a check valve in said inlet pipe to prevent egress of water from said tank through said inlet pipe, and an overflow pipe extending from a lower portion of said tank to an orifice at a level above the surface of the body of water in which the barge is used and below the fuel discharge pipe inlet in the dome so that water in the tank can not rise above said orifice, whereby as fuel is placed into the tank water therein is expelled through said discharge pipe and as the fuel is withdrawn from the dome fuel is replaced by water drawn into the tank through said inlet pipe, the water in said overflow pipe being active to maintain fuel in the dome in communication with the fuel discharge line.

8. The invention of claim 7 in combination with an air conduit communicating with said dome, a normally closed valve for closing said air conduit, a float having a density intermediate the density of fuel and water, and a linkage between said float and said air valve to open said air valve when the water level in said tank reaches the level of the orifice of said overflow pipe, whereby when the water level reaches the level of the overflow orifice, the valve opens to admit air into said dome and the fuel discharge line.

9. A fuel barge including a main tank having a top wall and a bottom wall, a dome of smaller horizontal area than the tank and mounted on the top wall of said tank in fluid communication therewith, an overflow pipe extending from said tank adjacent the bottom wall to the exterior of the tank and terminating in an orifice at a level approximating the top wall of said tank, a fuel discharge pipe communicating with the interior of the dome at a level above the top wall of said tank, a water inlet pipe communicating with said tank proximate the bottom wall for affording ingress of water to replace fuel withdrawn through said fuel discharge pipe, a normally closed air inlet conduit to said dome, and means for opening said air inlet conduit when the level of water in said tank reaches said top wall.

10. In a barge having a tank with a top wall and a bottom wall for storing and dispensing fuel that is less dense than and immiscible with water, which barge is of the type wherein fuel withdrawn from the tank is replaced by water and during such withdrawal the interface between water and fuel in the tank rises, the improvement comprising a dome mounted on said top wall in fluid communication with said tank, said dome having a height equal to $(Sp_w-Sp_f)/Sp_f$ times the vertical distnace between said top and bottom walls, wherein $Sp_w$ is the specific gravity of water and $Sp_f$ is the specific gravity of fuel, a fuel discharge pipe communicating from the upper region of said dome to the exterior thereof, a pump for withdrawing fuel from said discharge pipe, a water inlet pipe communicating with said tank adjacent the bottom wall thereof, a check valve in said inlet pipe for preventing egress of water from said tank through said water inlet pipe, and an overflow pipe extending from said tank adjacent the bottom wall to an upwardly opening orifice at a level approximating that of said top wall, whereby as fuel is withdrawn from said fuel discharge pipe water is drawn in through said water inlet pipe so that fuel which floats on the water, surrounds said fuel discharge pipe so as to be withdrawn therethrough.

11. In a fuel barge which includes a tank for containing fuel and water and also includes an overflow column extending from a lower region of said tank to an orifice at a level above the surface of the body of water in which the barge is used, a safety enclosure for said orifice comprising means defining a closed compartment containing said orifice and extending from a level below the surface of the water to a level above said orifice, means including a flame arrester venting said compartment to the surrounding atmosphere, a valve for selectively communicating said compartment to the body of water below the surface thereof, said valve having an actuator arm movable between an upper open position and a lower closed position, and a float having a density intermediate the density of water and the density of fuel attached to said actuator arm, so that when said compartment is full of water said float holds said valve open and when said compartment is full of fuel said float sinks in the fuel to close the valve and prevent egress of fuel to said body of water.

References Cited by the Examiner

UNITED STATES PATENTS

| | | | |
|---|---|---|---|
| 1,710,006 | 4/1929 | Peter | 114—74 |
| 2,026,279 | 12/1935 | Jackson. | |
| 2,947,437 | 8/1960 | Greer | 220—13 |
| 3,019,948 | 2/1962 | Huska | 222—395 |
| 3,076,205 | 2/1963 | Schultz | 114—0.5 X |

MILTON BUCHLER, *Primary Examiner.*

T. M. BLIX, *Assistant Examiner.*